Patented June 7, 1949

2,472,591

UNITED STATES PATENT OFFICE 2,472,591

METHOD OF PREPARING AN OXIDIZED NITRATED CELLULOSE

William O. Kenyon and William F. Fowler, Jr., Rochester, N. Y., assignors to Eastman Kodak Company, Rochester, N. Y., a corporation of New Jersey No Drawing. Application March 29, 1946, Serial No. 658,218

6 Claims. (Cl. 260—220)

This invention relates to a method of preparing an oxidized nitrated cellulose by subjecting cellulose to treatment with a mixture of $N_2O_4$ and a chlorinated hydrocarbon together with an appreciable percentage of nitric acid therein.

Cellulose has previously been oxidized by treating cellulose with $N_2O_4$. For instance, in Yackel and Kenyon Patent No. 2,232,990, cellulose is treated with gaseous $NO_2$, and a product having an appreciable carboxyl content is obtained. In that case avoidance of nitrogen content was desired, and the process as described results in a product having little or no nitrogen present therein. In U. S. Patent No. 2,256,391 of Hiatt cellulose is treated with $NO_2$ and nitric acid. The product obtained according to the method of that patent contains no appreciable nitrogen content. Cellulose has also been treated heretofore with nitric acid to prepare cellulose nitrate. However, in those cases no oxidation of the cellulose occurred, and if any oxidation would have been attempted in those processes, it is believed that degradation of the cellulose thus treated would result.

One object of our invention is to prepare a cellulose product in which both oxidation and nitration of the cellulose occur. Another object of our invention is to prepare an oxidized, nitrated cellulose in which degradation of the cellulose is avoided. A further object of our invention is to provide a process for preparing an oxidized cellulose which has much greater susceptibility to organic solvents than celluloses which have been oxidized heretofore with nitrogen dioxide. A still further object of our invention is to provide a method of preparing an oxidized, nitrated cellulose using therefor a solution of a mixture of nitrogen dioxide and nitric acid in a halogenated hydrocarbon. Other objects of our invention will appear herein.

We have found that when cellulose is treated with a mixture of nitrogen dioxide and anhydrous nitric acid with a halogenated hydrocarbon under certain limited conditions that the cellulose is both oxidized and nitrated without any appreciable degradation of the cellulose occurring. We have found that by this treatment a nitrogen content may be imparted to cellulose up to as much as the mono-nitrate and at the same time a carboxyl content is imparted to the cellulose. We have found that these results are best accomplished by subjecting cellulose to treatment with an anhydrous composition in which the nitrogen dioxide and the carbon tetrachloride are approximately equal, and the nitric acid content of the liquid is within the range of 4 to 25%. For best results the cellulose should be present in an amount within the range of approximately 2–5%, based on the total liquid present. It is desirable that the cellulose be in a comminuted form so that it may be readily treated by the liquid and that the treatment be carried out under agitated conditions so as to assure uniform distribution of the liquid throughout the cellulose mass. In some cases, however, the cellulose may be in a loosely woven condition and penetration of the treating liquid may be obtained equally as well. It is important that the liquid be present in sufficient amount to completely wet the cellulose, and, on the other hand, it is important that the cellulose be present in sufficient amount to prevent degradation, such as might be caused by the use of an excessive amount of liquid. The treatment is carried out with agitation and preferably at ordinary or room temperature. Elevated temperatures are to be avoided as this might result in violent action, or at least in excessive nitration of the cellulose. If an extremely low temperature is employed, the reaction is slowed down considerably. Also, a very low temperature is conducive to separation of the treating liquid into two phases.

We have found that the most desirable range of time within which to treat cellulose in accordance with our invention is 1½ to 4 hours, the exact time selected depending upon whether the operator desires emphasis on the nitrogen or the carboxyl content of the resulting product. For instance, in the earlier portion of the time range the ratio of nitrogen present in the product to carboxyl therein is much greater than towards the end of the time range given.

We have found that the proportion of nitric acid in the treating liquid should be between the range of 4 to 25% to obtain the best results. With an amount of nitric acid below 4% the nitrogen content of the resulting product is rather small, while if an amount of nitric acid is used beyond the upper part of the range, the nitration is also less than obtained with lower nitric acid contents and in addition there is a tendency to degrade the cellulose. Useful proportions of the various materials which have been found to be very satisfactory are the following: 5 parts of cellulose, 60 parts of carbon tetrachloride, 60 parts of $N_2O_4$, and an amount of nitric acid within the range of 5 to 40 parts. We have found that it is desirable to keep the water content of the system extremely low and, therefore, it is desirable to use anhydrous nitric acid. The treating liquid should be anhydrous. By the same token, it is desirable to use cellulose having a low moisture content, such as less than 1%.

In the operation in accordance with our invention one may use either pure liquid $N_2O_4$ or may use $N_2O_4$ of technical grade keeping in mind the requirement as to freedom from water. If $N_2O_4$ of technical grade is employed, the nitric acid content thereof must also be taken into account in operating the process so that the nitric acid amount is limited to a range of 4 to 25%. For convenience in operation it is desirable to carry out the cellulose treatment either in a closed vessel or in a vessel fitted with a reflux condenser to avoid loss of the volatile materials which are employed in the operation. Any of the liquid halogenated hydrocarbons may be employed as diluents or solvents in the process in accordance with our invention. Some of the halogenated hydrocarbons which are particularly useful for this purpose are carbon tetrachloride, propylene dichloride, 1,1-dichloro-1-nitropropane, hexachlorethane, tetrachlorethane, chlorobenzene, and the like which are inert to nitrogen dioxide, nitric acid, and to cellulose.

The nitration of the cellulose which occurs may reach the nitrogen value of cellulose mono-nitrate. On the other hand, under some conditions of reaction, the nitrogen content imparted to the product may not be any more than 2½ or 3%. Some products may have a nitrogen content between 2½ and 7% of nitrogen, depending upon the time of treatment and the proportion of nitric acid imparted in the treating liquid. Ordinarily, the carboxyl content of the products obtained in accordance with our invention will be within the range of 2 to 8% determined by the calcium acetate method (J. A. C. S. 64, 121, Yackel and Kenyon) here again depending upon the conditions of operation. With a longer time of treatment and use, the nitrogen dioxide present in comparatively large proportion, the carboxyl content will be in the upper part of the range, and the nitrogen content will be in the lower portion of its range, whereas with a short time of treatment and a high nitric acid content, the products will exhibit carboxyl contents within the lower portion of the range, and the nitrogen contents will be within the higher portion of their range.

The following examples illustrate our invention:

*Example 1.*—Cellulose gauze was dried at 110° C. for two hours. Five g. of this material were added, contained in an ammonium citrate bottle, to a mixture containing 60 g. of dry liquid $N_2O_4$, 60 g. of specially purified carbon tetrachloride, and 5 g. of anhydrous 100% nitric acid. The bottle was then sealed and agitated mechanically at room temperature for three hours. At the end of that time the pressure was released on the bottle, and the gauze removed, washed with several changes of carbon tetrachloride, then with several changes of absolute ethanol, and then with several changes of distilled water to render the water leaching from the gauze neutral to brome thymol-blue solution. The gauze was then spread out and permitted to dry at room temperature. Upon drying it was analyzed for carboxyl content by the calcium acetate method and for nitrogen content by the Duvarda method. This sample was found to contain 7.54% carboxyl and 2.8% nitrogen.

*Example 2.*—Reaction conditions were similar to those described in Example 1 except that in the present instance 6 parts of anhydrous nitric acid were used, and the reaction time was four hours. This sample contained 6.20% carboxyl and 4.1% nitrogen.

*Example 3.*—The following mixture was permitted to react together for one hour under conditions similar to those described in Example 1: 5 g. of oven-dried cellulose gauze, 60 g. of specially purified carbon tetrachloride, 60 g. of liquid nitrogen peroxide, and 40 g. of anhydrous nitric acid (25%). The nitrogen content of the resulting product was 4.65%.

*Example 4.*—In order to bring the anhydrous nitric acid into complete solution in the liquid phase of the reaction mixture the following mixture was placed in a pressure bottle and treated for two hours as in Example 1: 5 g. of oven-dried cellulose gauze, 60 g. of liquid nitrogen peroxide, 60 g. of carbon tetrachloride, 15.5 g. of 1,1-dichloro-1-nitropropane, and 7 g. of anhydrous 100% nitric acid. The working up of the sample was the same in this instance as in the other examples. The resulting product contained 3.90% carboxyl and 4.39% nitrogen.

*Example 5.*—A homogeneous solution was formed by mixing together 60 g. of pure liquid nitrogen dioxide, 60 g. of 1,1-dichloro-1-nitropropane and 7 g. of anhydrous 100% nitric acid. This solution was placed in a long tube and 5 g. of oven-dried ground cellulose (100 mesh) were added. The cellulose was thoroughly mixed with the liquid by careful agitation and the mass was permitted to stand for three hours at room temperature with an attached drying tube protecting the contents of the tube. The cellulose was then removed from the liquid, rinsed once with carbon tetrachloride and then with ethyl alcohol. The cellulose was washed acid-free with distilled water and dried in the air. The product was found to have the following: carboxyl content, 7.95% by the calcium acetate analysis method; nitrogen content, 1.3%; moisture content, 5.75%. The cellulose was almost completely soluble in 1% aqueous sodium hydroxide solution.

As pointed out previously, it is important that the reaction mass to prepare oxidized nitrated cellulose in accordance with our invention be as nearly anhydrous as possible. The anhydrous 100% nitric acid which was used as described in the examples was prepared by distilling a mixture of commercial grades of concentrated sulfuric and nitric acids in a stream of dry carbon dioxide. The distillate obtained between 82 and 83° C. was taken. This liquid, slightly yellowish in color, was freed of dissolved nitrogen dioxide by heating at 40° C. while bubbling carbon dioxide through the acid. A sample of the resulting acid analyzed by titration showed 100% nitric acid and was water white. This nitric acid was stored in a brown glass-stoppered bottle at 3° C. when not in use and was not held longer than seven days. If desired, the anhydrous 100% nitric acid employed in accordance with our invention may be prepared by other means in which such a product is obtained, it being desirable that a method be used in which the acid analyzes 0% for moisture content. If desired, the method described in application, Serial No. 582,002, of English and Lawson, filed March 31, 1945, may be employed for obtaining pure anhydrous nitric acid, the usefulness of the method, of course, depending upon the nitric acid which is available as the starting material.

The nitrogen dioxide, sometimes referred to as $N_2O_4$ or nitrogen tetroxide which is to be employed in processes in accordance with our invention, should be carefully prepared so that the absence of moisture therefrom is assured. The nitrogen dioxide employed in the examples given was prepared by a careful distillation, and each batch of this material was characterized by a freezing point curve showing it to be anhydrous and that it freezes to a clear colorless transparent solid at a temperature of −11.3° C. The nearer the nitrogen dioxide employed comes to these values, the more satisfactory the process carried out in accordance with our invention.

The carbon tetrachloride employed also should be free of water and preferably any material which is not of a neutral type. The carbon tetrachloride employed in the examples was washed with aqueous sodium hydroxide, followed by separation of the carbon tetrachloride layer therefrom, drying the carbon tetrachloride with anhydrous magnesium sulfate, filtering, and distilling. The distillate which came over within the range of 76 to 76.5° C. at atmospheric pressure was employed. Although for the examples the materials may have been refined more highly than necessary, it is recommended that high refinement of the reagents used be employed to assure satisfactory operation of the process.

The 1,1-dichloro-1-nitropropane employed in Examples 4 and 5 was dried by means of anhydrous magnesium sulfate and the resulting liquid was filtered and distilled at a reduced pressure. The cellulose gauze which had a viscosity of about 900 poises in cuprammonium solution was dried just prior to its treatment with the reactants by subjecting the cellulose to a temperature of 110° C. for two hours. The moisture content of the cellulose at this point was .8%.

It is to be understood that our invention includes within its scope the treatment of cellulose broadly whether the cellulose is in the form of cotton, cotton linters, or refined woodpulp. Even other forms of cellulose, such as ramie, are suitable for treatment in accordance with our invention. It is desirable, however, for the preparation of products having good characteristics that the cellulose employed be of a refined type, such as is ordinarily employed at the present time as the starting material in the preparation of cellulose products, cellulose of this type being ordinarily referred to as chemical cellulose.

We claim:

1. A method of preparing oxidized nitrated cellulose which comprises treating bone-dry cellulose with an anhydrous mixture of nitrogen dioxide, nitric acid, and a halogenated hydrocarbon, the nitrogen dioxide and the halogenated hydrocarbon being employed in approximately equal amounts, the nitric acid being employed in an amount constituting 4–25% of the total liquid, and the cellulose treated being approximately 2–5%, based on the total liquid with which it is treated.

2. A method of preparing oxidized nitrated cellulose which comprises treating bone-dry cellulose with an anhydrous mixture of nitrogen dioxide, 1,1-dichloro-1-nitropropane, and nitric acid, the halogenated hydrocarbon and nitrogen dioxide being present in approximately equal amounts, the nitric acid being present in an amount constituting 4–25% of the total liquid, and the amount of cellulose treated being approximately 2–25%, based on the total weight of liquid.

3. A method of preparing oxidized nitrated cellulose which comprises treating bone-dry cellulose with an anhydrous mixture of nitrogen dioxide, nitric acid, and carbon tetrachloride, the nitrogen dioxide and the carbon tetrachloride being employed in approximately equal amounts, the nitric acid being employed in an amount constituting 4–25% of the total liquid and the cellulose treated being approximately 2–5% of the total liquid employed to treat the cellulose.

4. A method of preparing oxidized nitrated cellulose which comprises treating 5 parts of bone-dry cellulose with an anhydrous mixture of 60 parts of carbon tetrachloride, 60 parts of nitrogen dioxide and 5–40 parts of nitric acid, whereby a product is obtained having substantial nitrogen and carboxyl contents.

5. An oxidized and nitrated cellulose having a nitrogen content of 2½–7% and a carboxyl content of 8–2% as determined by the calcium acetate method of analysis for carboxyl.

6. An oxidized and nitrated cellulose having a nitrogen content of 2½–3% and a carboxyl content of 8–2% as determined by the calcium acetate method of analysis for carboxyl.

WILLIAM O. KENYON.
WILLIAM F. FOWLER, Jr.

REFERENCES CITED

The following references are of record in the file of this patent:

UNITED STATES PATENTS

| Number | Name | Date |
| --- | --- | --- |
| 1,572,248 | Sheppard et al. | Feb. 9, 1926 |
| 1,939,235 | Staud | Dec. 12, 1933 |
| 2,092,749 | Bradshaw | Sept. 14, 1937 |
| 2,232,990 | Yackel et al. | Feb. 25, 1941 |
| 2,256,391 | Hiatt | Sept. 16, 1941 |